R. C. BARTLETT.
VEHICLE CONSTRUCTION.
APPLICATION FILED JAN. 13, 1914.

1,156,875.

Patented Oct. 19, 1915.
2 SHEETS—SHEET 1.

Witnesses

Inventor
R. C. Bartlett.

By
Attorney

R. C. BARTLETT.
VEHICLE CONSTRUCTION.
APPLICATION FILED JAN. 13, 1914.
1,156,875.
Patented Oct. 19, 1915.
2 SHEETS—SHEET 2.
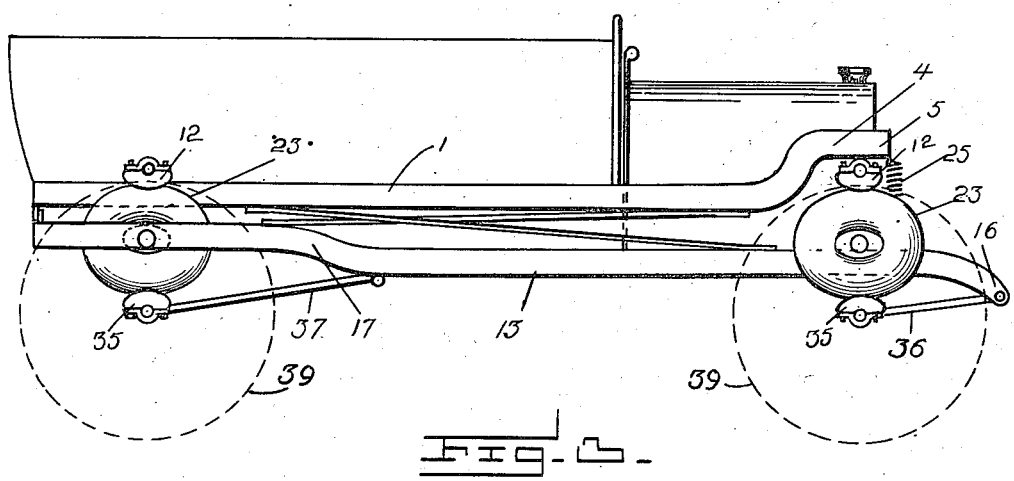
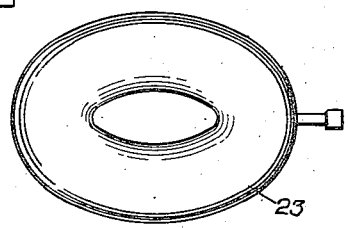
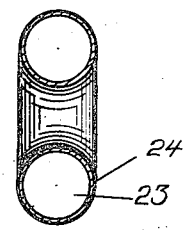
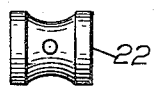
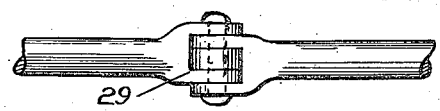
Witnesses
R. C. Bartlett
Inventor

UNITED STATES PATENT OFFICE.

REGINALD CLEVELAND BARTLETT, OF TORONTO, ONTARIO, CANADA.

VEHICLE CONSTRUCTION.

1,156,875. Specification of Letters Patent. Patented Oct. 19, 1915.

Application filed January 13, 1914. Serial No. 811,880.

*To all whom it may concern:*

Be it known that I, REGINALD CLEVELAND BARTLETT, a subject of the King of Great Britain, and resident of 16 Spencer avenue, in the city of Toronto, county of York, Province of Ontario, in the Dominion of Canada, have invented certain new and useful Improvements in Vehicle Construction, of which the following is a specification.

The invention relates to improvements in vehicle construction as described in the present specification and shown in the accompanying drawings that form part of the same.

The invention consists essentially of the novel construction and arrangement of parts, whereby a resilient support is assured for the body of the vehicle, the latter traveling on running gear having solid tires, and whereby other necessary accompaniments are embodied to meet the requirements of the structure.

The objects of the invention are to devise a vehicle having an easy riding body, to eliminate the constant renewal of tires, and generally to provide a cheap, durable and serviceable construction.

Figure 1:
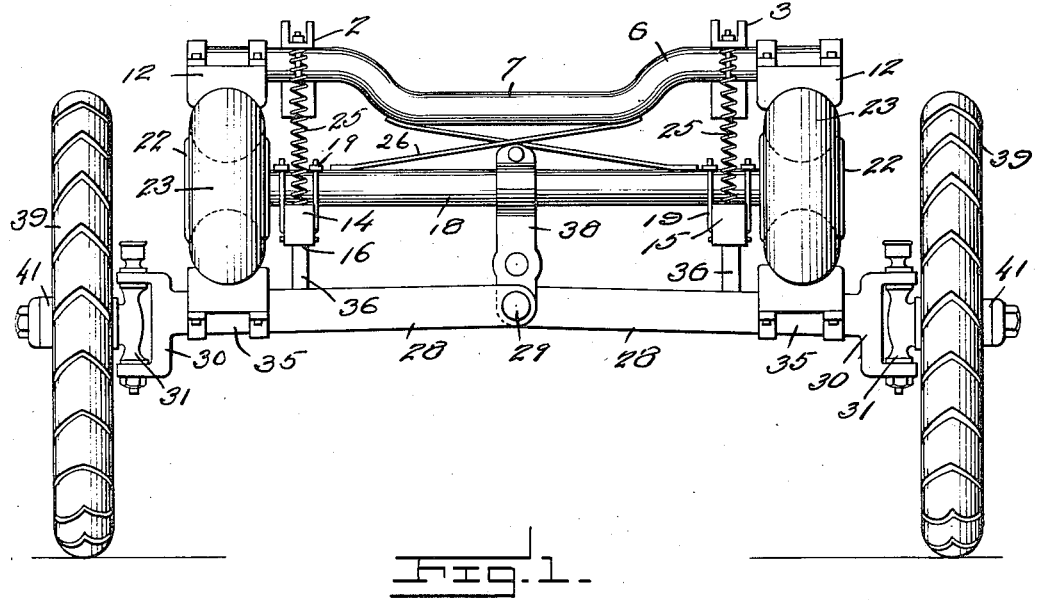
Figure 2:
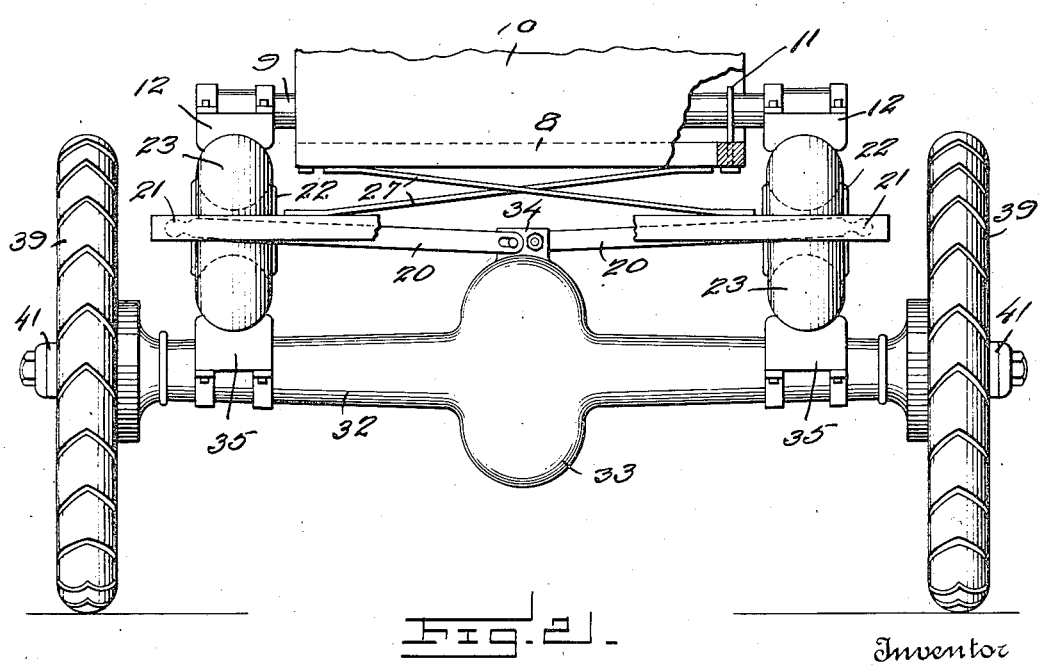

In the drawings, Figure 1 is a front elevation of the truck. Fig. 2 is a rear elevation of the truck. Fig. 3 is a side elevation of the truck frame. Fig. 4 is a detail showing a side view of a pneumatic supporting member of the truck frame. Fig. 5 is a cross sectional view of a pneumatic supporting member. Fig. 6 is a detail showing a side view of the bearing block adapted to be inserted in the central opening in the pneumatic member. Fig. 7 is a detail showing an end view of the bearing illustrated in Fig. 6. Fig. 8 is a detail showing the knuckle joint in the front axle.

Like numerals of reference indicate corresponding parts in each figure.

Referring to the drawings, 1 is the upper member of the truck frame corresponding to the body bolster in car construction said member being formed of the longitudinal bars 2 and 3 of channel, angle or tube formation extending from the front to the rear of the vehicle in substantially parallel arrangement, at the front ends having the offsets 4 forming the lug ends 5, and the transverse front bar 6 centrally depressed at 7 and supporting said longitudinals under the lugs ends 5, and the transverse rear bar 8.

9 is a transverse bar extending through the body 10 and connected to the bars 2 and 3 by the strap hangers 11, said bar 9 corresponding in the rear to the front bar 6 in supporting the frame 1 on the running gear.

12 are bearing blocks grooved from end to end and rigidly strapped to the ends of the bars 6 and 9 projecting laterally beyond the longitudinals 2 and 3.

13 is the lower member of the truck frame corresponding to the truck bolster in car construction, formed of the longitudinal bars 14 and 15, said longitudinals being slightly depressed at their front ends 16 and a little offset at 17 toward their rear ends, thus widening the distance from each other, and the front transverse bar 18 above the said longitudinals 14 and 15 and secured thereto by the U-shaped bolts 19, and the split transverse bar 20 toward the rear ends in the wider portion of the member and secured thereto in sockets in said members in the form of a ball and socket joint, as the halves of said split bar 20 each terminate in a ball member 21 to the joints.

22 are bearing blocks annularly grooved and mounted on the bars 18 and 20 adjacent to the outer ends thereof.

23 are pneumatic buffers formed of air tight ring tubes having an air inlet and outlet and a suitable valve, said buffers being made of any suitable material such as a rubber and a rubber impregnated textile, the rubber tubes being each preferably inclosed in a leather casing 24. In their inflated state the buffers fit snugly around the bearing blocks 22 and under the bearing blocks 12 thus becoming part of the truck frame.

25 are adjusting springs connecting the frames 1 and 13 toward the front ends, the said springs causing an upward pull on the frame 13 and thereby causing the frame 1 to bear a portion of the weight attached to the frame 13.

26 are crossed straps at the front end, and 27 are crossed straps at the rear end to avoid lateral movement of the upper and lower frame members in relation to one another.

28 is the front axle formed of two parts joined centrally of the knuckle joint 29 and terminating in the customary yokes 30 and bearing member 31.

32 is the rear axle formed with the central gear case 33 as customary, said gear case on the top thereof having the lug 34.

35 are bearing blocks similar to the bearing blocks 12 and rigidly secured to the axles 28 and 32 adjacent to the ends thereof, said blocks 35 receiving the undersides of the buffers 23 while the central parts of the split transverse bar 20 are pivotally secured to the lug 34.

36 are braces securing the front ends of the longitudinals 14 and 15 to the front axle 28.

37 are braces securing the offset ends 17 of the longitudinals 14 and 15 to the rear axle 32.

38 is a link pivotally connecting the knuckle joint 29 to the transverse bar 18, thus joining the truck frame, including the buffers, at the front end to the axle, as it is joined at the rear end by the ends of the transverse bar 20. It will thus be seen that a body mounted on said truck frame will be resiliently supported so that any jars, jolts or vibrations to or of said axles will not be communicated to said body other than by a gentle easing motion which will in no way affect the occupant or contents of said body, because the buffers accommodate themselves to each movement of the running gear and no matter how sharp the jolt may be it is translated to an easy motion.

The vehicle may be said to be now complete ready for the installation of the motor and steering mechanism and as these parts may be of any efficient type, nothing in relation thereto will be described in this specification.

The proper support of the body is what this invention is intended to accomplish and that it does so will be better explained by a short résumé of the construction already described.

It will thus be seen that the truck frame is cushioned between the axles and itself and between itself and the body besides having flexible connections to the axles, thus insuring the maximum of accommodation for the translation of a sudden jolt into an easy motion.

The parts are here described in detail as particularly pertaining to this invention but it must be understood many changes may be made by addition, alteration or otherwise, so long as the construction is kept within the scope of the claims following.

What I claim is:—

1. In vehicle construction, a truck comprising upper and lower members each having transverse and longitudinal bars and running gear, the lower ones of said transverse bars being supported on the axles by pneumatic cushions and the upper ones being separated from the lower ones by the same pneumatic cushions.

2. In vehicle construction, a truck having upper and lower members supported on a running gear and fluid cushions extending from between the axles of the running gear to between the upper and lower members and forming resilient supports within the frames and for said frames on said running gear.

3. In vehicle construction, running gear and a truck frame formed of upper and lower members separated by pneumatic cushions, said cushions being also introduced between said lower member and the axles of the running gear.

4. In vehicle construction, running gear and a truck frame formed of upper and lower members having regulating springs therebetween and pneumatic cushions within said frame members and between said truck frame and the running gear.

5. In vehicle construction, running gear and a truck frame having upper and lower members, pneumatic ring shaped cushions between said members and between said frame and running gear and flexible connections securing said frame to said running gear.

6. In vehicle construction, running gear and a truck frame formed of an upper member having longitudinal and transverse bars, ring shaped pneumatic cushions under said transverse bars, a lower member having longitudinal and transverse bars, said transverse bars extending into the centers of said cushions, the latter resting on the axles, and flexible links securing said lower member to said axles.

7. In vehicle construction, running gear and a truck frame formed of an upper member having longitudinal and transverse bars, the latter projecting beyond the former, grooved bearing blocks mounted on the projecting ends of said transverses, oval ring-shaped pneumatic cushions under said bearing blocks, a lower member having longitudinal and transverse bars, the latter at the front projecting beyond the former and at the rear flexibly connected therewith and with the running gear, grooved bearing blocks on said transverses and inserted in the centers of said cushions, and grooved bearing blocks secured to the axles of said running gear and supporting said cushions.

8. In vehicle construction, running gear and a truck frame formed of an upper member having longitudinal and transverse bars, pneumatic cushions under said transverses, a lower member having longitudinal and transverse bars, the latter extending into the centers of said cushions, the rear transverse of said lower member being flexibly connected to the rear axle in the center thereof and flexibly connected to said longitudinals of the lower member and a link flexibly connecting the front transverse of the lower frame to the front axle.

9. In vehicle construction, a truck frame having upper and lower cushioned members, running gear having a split front axle, a knuckle joint joining the parts of said axle, transverse links connecting said truck frame to the rear axle of said running gear and a vertical link connecting said knuckle joint to said truck frame.

10. In vehicle construction, running gear and a truck frame formed of an upper member having parallel longitudinal bars and parallel transverse bars, a lower member having longitudinals widening from one another toward their rear ends, a front transverse secured to said longitudinals and flexibly secured to the front axle and a rear transverse in two parts forming links pivotally connected to the rear axle and universally connected to the longitudinals in the widened part and pneumatic cushions resiliently separating parts of said frame and supporting said frame from the running gear.

11. In vehicle construction, a body, a truck having its upper member secured to the body and its lower member resiliently supported from the running gear and resiliently supporting said upper member, and vertical springs adjustable and arranged between the upper and lower members of said truck and regulating the pressure on said resilient supports and themselves forming a cushion.

12. In vehicle construction, a truck, having upper and lower transverse bars, a plurality of oval shaped pneumatic air cushions each having a central core piece of a stable nature to receive the lower transverse bars, said core piece being of shorter dimensions than the ring opening.

13. In vehicle construction, a truck having upper and lower frames, pneumatic cushions between the running gear of the truck and the lower frame and between the lower frame and the upper frame, a plurality of tie members joining the said upper and lower members at their front ends and formed of helical springs adjustably secured and in tension.

14. In vehicle construction, a truck having upper and lower members and running gear and pneumatic cushions with solid central cores between said members and between one of said members and the running gear, said running gear having a front axle comprising two parts joined by a knuckle joint centrally and extending to the wheel, said joint being secured to the center of the front transverse bar of the lower member, the said transverse bar projecting into the core pieces of the pneumatic cushions and forming a cushioned fulcrum for the swinging of said axle parts.

15. In vehicle construction, a truck frame having upper and lower members having cross and longitudinal bars pneumatically cushioned one from the other and from the running gear, said lower members having a lower transverse member split centrally and pivotally joined to the center of the rear axle and universally joined to the said bars of the lower member and forming a pivot point and coacting with the cushion member in stabilizing the body.

Signed at the city of Toronto, this 28th day of November, 1913.

REGINALD CLEVELAND BARTLETT.

Witnesses:
W. G. HAMMOND,
M. BLACKWELL.